United States Patent [19]

Goller et al.

[11] 4,426,340

[45] Jan. 17, 1984

[54] PROCESS FOR FABRICATING RIBBED ELECTRODE SUBSTRATES AND OTHER ARTICLES

[75] Inventors: Glen J. Goller, West Springfield, Mass.; Richard D. Breault, Coventry, Conn.; J. Harold Smith, Amherst, Mass.

[73] Assignee: United Technologies Corporation, Hartford, Conn.

[21] Appl. No.: 306,836

[22] Filed: Sep. 29, 1981

[51] Int. Cl.³ .............................................. B29C 25/00
[52] U.S. Cl. ................................... 264/29.1; 264/295; 264/105; 264/113
[58] Field of Search ..................... 264/29.1, 105, 29.5, 264/113

[56] References Cited

U.S. PATENT DOCUMENTS

| | | | |
|---|---|---|---|
| 3,779,811 | 12/1973 | Bushnell et al. | 429/41 |
| 3,839,091 | 10/1974 | Bloomfield | 429/9 |
| 3,855,002 | 12/1974 | Schroll | 429/41 |
| 3,867,206 | 2/1975 | Trocciola et al. | 429/35 |
| 3,972,735 | 8/1976 | Breault | 204/294 |
| 4,064,322 | 12/1977 | Bushnell et al. | 429/41 |
| 4,115,627 | 9/1978 | Christner et al. | 429/44 |
| 4,165,349 | 8/1979 | Sandelli | 264/29.1 |
| 4,269,642 | 5/1981 | Decasperis et al. | 429/36 |

*Primary Examiner*—James H. Derrington
*Attorney, Agent, or Firm*—Stephen E. Revis

[57] ABSTRACT

A process for fabricating a resin bonded carbon fiber article, and in particular electrochemical cell electrode substrates and the like requiring different mean pore sizes in different areas, involves simultaneously heating and compacting different mixtures of carbon fibers and resin in different areas of an article forming mold, wherein the carbon fibers in each of the different mixtures have different, known bulk densities. The different bulk densities of the carbon fibers in the mixtures are chosen to yield the desired mean pore sizes and other properties in the article after heating and compacting the mixtures. Preferably, the different bulk densities are obtained using different carbon fiber lengths in the molding mixtures. The process is well suited to forming ribbed electrode substrates with preselected optimum mean pore sizes, porosities, and densities in the ribs, the webs connecting the ribs, and in the edge seals.

29 Claims, 9 Drawing Figures

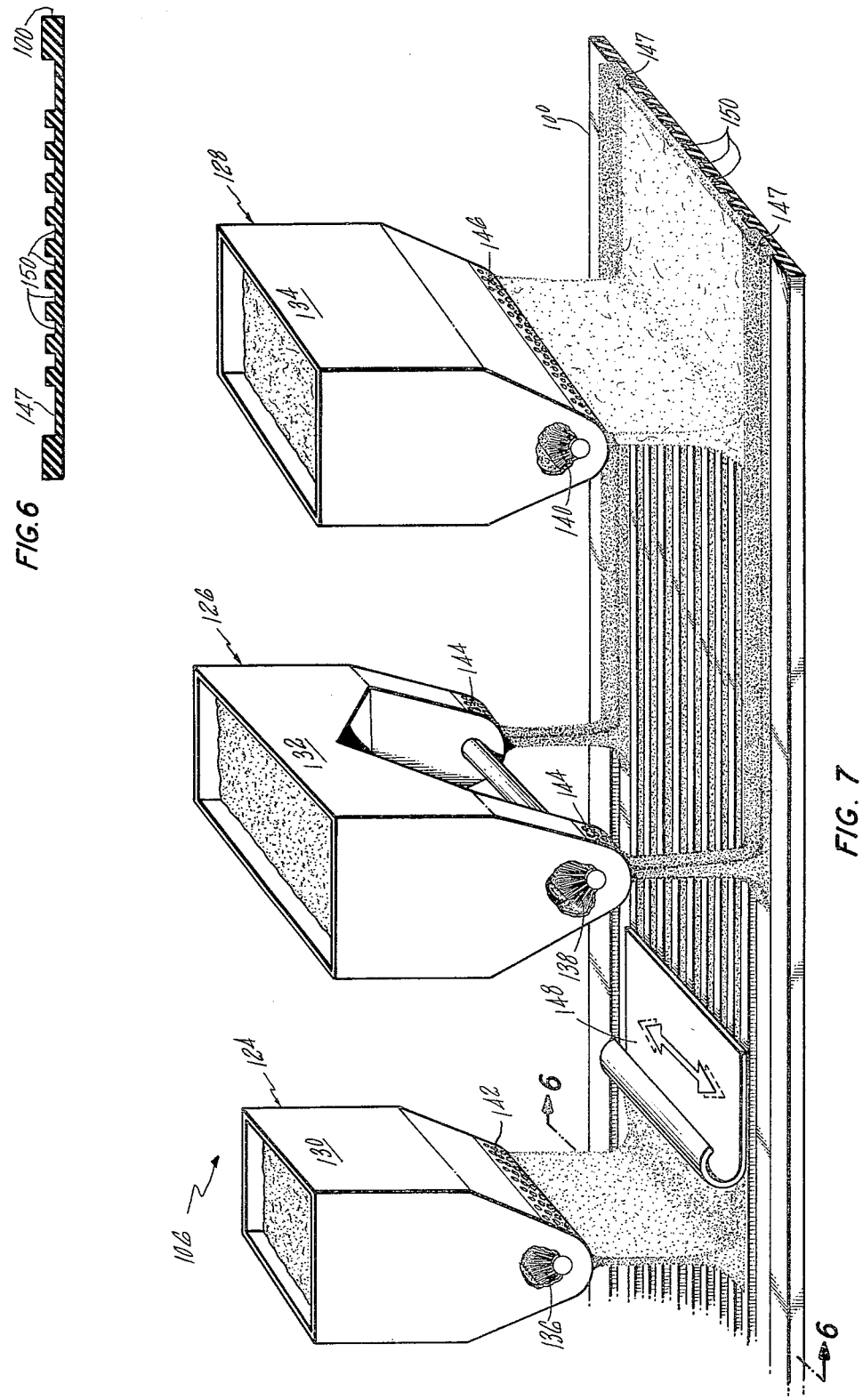

FIG. 8
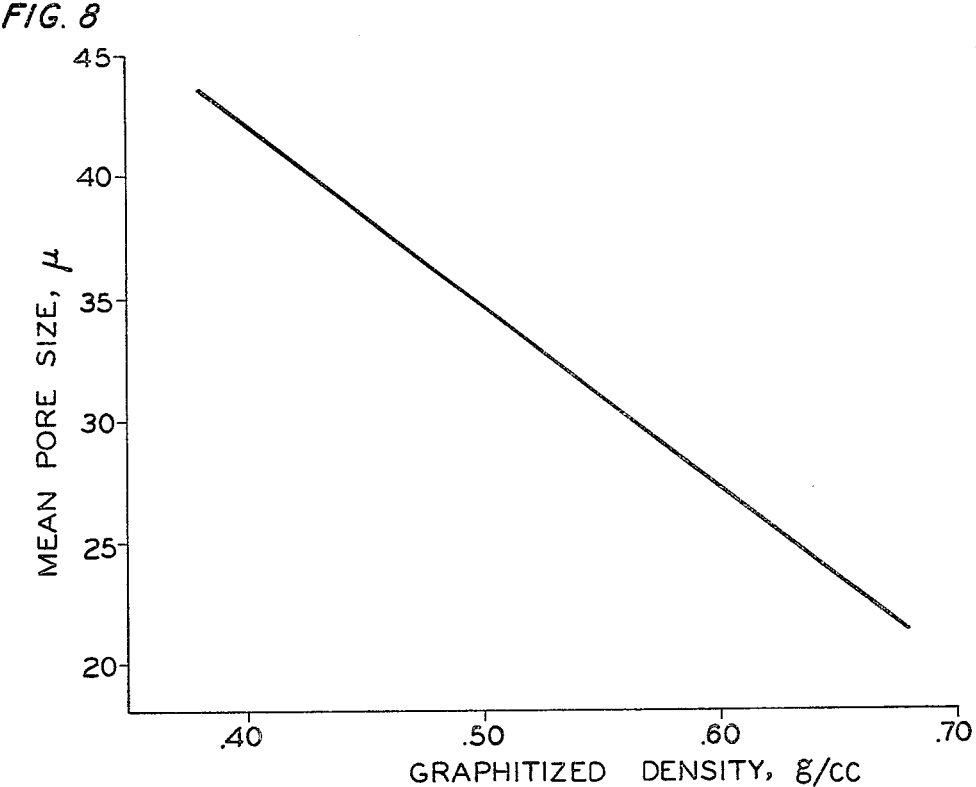
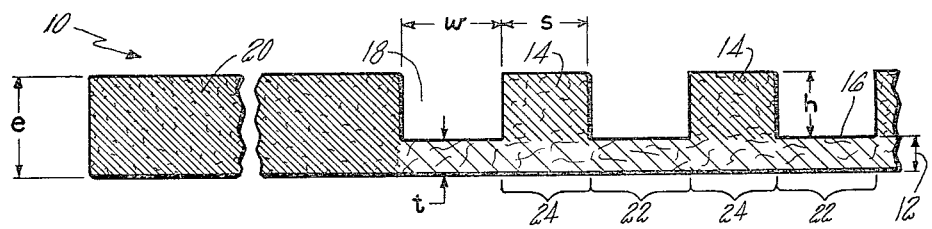
FIG. 9

PROCESS FOR FABRICATING RIBBED ELECTRODE SUBSTRATES AND OTHER ARTICLES

DESCRIPTION

1. Technical Field

This invention relates to porous, resin bonded carbon fiber articles and methods for manufacturing the same.

2. Background Art

The economical fabrication of thin, porous, resin bonded carbon fiber substrates for fuel cell electrodes, has become increasingly difficult as substrate functional requirements and structural configurations have become more complex and performance criteria have become more demanding. For example, in addition to having sufficient structural strength, electrode substrates must provide support for a catalyst layer; provide a low pressure drop path for gaseous reactants to reach the catalyst layer; conduct electrons efficiently from the catalyst layer to an adjacent cell; conduct the heat of reaction from the catalyst layer, through adjacent cells to heat removal means; and provide considerable electrolyte storage capacity to accommodate changes in electrolyte volume.

Earlier electrode substrates were flat sheets made from resin bonded carbon fibers by well known paper making techniques, such as described in commonly owned U.S. Pat. No. 3,972,735. The flat electrodes were disposed adjacent ribbed gas impervious plates which separated adjacent cells and defined gas channels behind the electrode. These early electrode substrates were homogeneous throughout, and depended almost entirely upon appropriate impregnations of hydrophobic polymer (polytetrafluoroethylene) to assure that the reactant gas could pass through them while they also had the capability of holding some electrolyte to accommodate electrolyte volume changes during cell operation. For example, selective wetproofing coupled with holes being drilled or formed within the electrode substrate, as described in commonly owned U.S. Pat. No. 4,064,322, was one means for fabricating fuel cell electrode substrates with the necessary requirements. In some instances additional components were added to accomplish functions which would otherwise have to be accomplished by the electrode substrate. This made it easier to fabricate the electrode, but increased the cost and complexity of the cell. For example, as described in commonly owned U.S. Pat. Nos. 3,779,811 and 3,839,091, as separate layer disposed behind the electrode was added for electrolyte storage capacity and volume control.

The advent of the ribbed electrode substrate, such as described in commonly owned U.S. Pat. No. 4,115,627, provided a number of advantages. For example, it provided the opportunity for using the ribs to store excess electrolyte, while maintaining the webs which interconnect the ribs empty, or substantially so, for the passage of reactant gas therethrough to the catalyst layer. This was accomplished by impregnating the webs with polytetrafluoroethylene to prevent them from being able to carry electrolyte. However, this and other advantages were accompanied by new fabrication problems, since it is more difficult to economically fabricate a ribbed substrate than one which is simply a flat sheet.

In U.S. Pat. No. 4,115,627 the ribbed substrate was formed by molding a mixture of carbon pitch fibers and a phenolic resin within a die, the process being more fully described in commonly owned U.S. Pat. No. 4,165,349. In that molding process a homogeneous mixture of 20–50% thermosetting resin, by weight, and 80–50% carbon fibers having a length of between 10 and 100 mils is sifted into a die having the inverse image of the rib pattern desired in the substrate. Low pressure and heat are simultaneously applied to the mixture in a manner calculated to obtain the desired thickness of the part and to at least partially cure the resin so that the part will retain its shape and thickness when the pressure is removed. A flat plate punch or die is used to apply the pressure. It is shimmed so that it bottoms out when the desired thickness of the part has been reached. The temperature of the mixture is raised high enough to melt the resin without exceeding the final cure temperature of the resin. The part is then removed from the die and placed in a curing oven between flat plates to ensure that the part does not warp. The resin is then fully cured and the part is carbonized by heat treating in an inert atmosphere to at least 1100° C. to convert all the resin to carbon. A part made according to that process yielded a substrate having a porosity of approximately 65% in the web areas and 90% in the ribs. The part was then selectively wetproofed in a manner described in the patent to assure proper electrolyte distribution and transfer, and reactant gas flow during cell operation. Selective wetproofing is costly and therefore undesirable. Furthermore, the described molding and wetproofing process offers no way to truly control the relative porosities and mean pore sizes as between the webs and ribs, which is a distinct drawback.

An additional complication in the fabrication of electrode substrates are the edge seals described in commonly owned U.S. Pat. Nos. 3,867,206 and 3,855,002. Edge seals are very dense edge portions of the substrate which must remain saturated with electrolyte at all times to prevent the escape of reactant gases from the cells. They are typically referred to as wet seals. Prior art processes for forming such seals involve special fabrication steps. Note, for example, the edge seal forming process described in commonly owned U.S. Pat. No. 4,269,642, wherein 3,000 psi pressure is required to attain the necessary edge density. Compare this to aforementioned U.S. Pat. No. 4,165,349 which indicates that less than 150 psi pressure is all that is required to mold the rib and web portion of the substrate. High edge seal compaction pressures create the additional problem of excessive edge seal expansion (i.e., springback) during carbonization (heat treatment) in comparison to the central portion of the substrate which is comparatively dimensionally stable due to low forming pressures in that area. This results in the need for an extra grinding operation during part fabrication.

DISCLOSURE OF INVENTION

One object of the present invention is an improved process for forming porous, resin bonded carbon fiber articles.

Another object of the present invention is a process for forming porous, resin bonded carbon fiber articles having different but preselected mean pore sizes in different areas thereof.

Yet another object of the present invention is an improved molding process for forming ribbed fuel cell electrode substrates having different, preselected porosities and mean pore sizes in various areas.

A further object of the present invention is a process for molding resin bonded carbon fiber ribbed substrates for fuel cells wherein the as-molded substrate has less porosity and a smaller mean pore size in the ribs as compared to within the webs which interconnect the ribs.

Another object of the present invention is a process for forming a ribbed electrode substrate which requires no wetproofing to control electrolyte storage therein and reactant gas flow therethrough.

According to the present invention, fabricating resin bonded carbon fiber articles with preselected but different pore sizes in different areas includes the steps of depositing known quantities of carbon fiber/resin powder mixtures onto predefined areas of an article forming surface, the carbon fibers in each of said mixtures having a different, known, preselected bulk density, and heating and compacting the mixtures to a preselected thickness, wherein the different preselected bulk densities of the carbon fibers in the mixtures are chosen to yield densities, porosities and mean pore sizes of the desired magnitude within the corresponding areas of the compacted article.

An advantage of this process is the ability to obtain different properties and characteristics in different areas of an article without having to utilize different or additional fabrication steps or process parameters on each of these different areas. It has been discovered that, at temperatures just above the melting point of the resin, and for a known compacting pressure held sufficiently long to bond the carbon fibers together such that the article retains its compressed thickness, there is a direct and readily determinable relationship between the bulk density of the carbon fibers used in the dry mixture of resin and carbon fibers and the density of the finished article. Since porosity and mean pore size are directly related to density and the length to diameter ratio of the fibers, the porosity and mean pore size of the finished article can also be predicted from the properties of the starting materials.

Thus, a resin/carbon fiber dry mixture having a known initial volume and made from carbon fibers with a known bulk density and average fiber length to diameter ratio is heated to a temperature sufficient to melt the resin and compacted at a known pressure or reduced in volume to a known new volume (i.e., to the thickness of the part to be produced). The pressure and temperature are maintained at least until the carbon fibers are bonded to each other by the resin such that the compacted thickness does not change after the pressure is removed. The result is an article having an accurately predictable density, porosity, and mean pore size. The part can be further heat treated to carbonize the resin, and the heat treated part will have a new, but still predictable, density, porosity, and mean pore size. For the same quantity of material compacted under the same pressure, the higher the bulk density of fiber in the starting material, the greater the density and lower the porosity and mean pore size of the finished article.

After developing the above discussed relationships through a test program, an article can then be made having areas with different preselected densities and porosities by depositing different fiber bulk density carbon fiber/resin mixtures in appropriate amounts on the appropriate areas of an article forming surface or within a mold. These different fiber bulk density blends are all heated to the same temperature and compacted under predetermined pressure or to predetermined volumes, which determines the applied compacting pressure on each area. The heat and pressure are maintained until the carbon fibers are bonded and the thickness of the article does not change when the pressure is removed. By selecting the correct fiber bulk densities and amounts of materials, the finished article will have the required different densities in the appropriate areas.

One clear advantage of this invention is that separate steps need not be taken after or during forming of the article to modify its density, porosity or mean pore size in selected areas, which simplifies the fabrication procedure. The required different fiber bulk densities used in the starting materials may be obtained by using batches of carbon fibers having different average carbon fiber length to diameter ratios, since there is a determinable inverse relationship between the bulk density of a batch of carbon fibers and the average length to diameter ratio of carbon fibers within that batch. For ease in establishing this relationship, it is preferred to use batches of fibers having the same average carbon fiber diameter and different average fiber lengths. Fiber bulk density is thereby controlled by selecting an appropriate average length for the carbon fibers.

The process of the present invention is particularly well suited for forming electrode substrates for fuel cells. A novel and improved ribbed electrode substrate having a greater density (and, therefore, lower porosity and mean pore size) in the ribs than in the webs may now be fabricated in a molding operation by depositing a first resin/carbon fiber mixture in the rib forming area of the mold and a second resin/carbon fiber mixture in the web forming area of the mold, and heating and compacting the mixtures. The first mixture has a preselected carbon fiber average length to diameter ratio less than that of the second mixture; and, therefore, the fibers used in the first mixture have a bulk density greater than those in the second mixture. Preferably both mixtures comprise 50 to 80%, by weight, carbon fibers and 20 to 50%, by weight, carbonizable resin having a carbon yield of at least 40%. After the compaction pressure has been removed the molded article is further heated to carbonize the resin, which may include graphitization.

The present invention is also advantageous for fabricating substrates with dense edge seals (i.e., wet seals) of the type discussed in the Background Art portion of the specification. Recall that in forementioned U.S. Pat. No. 4,269,642 a pressure of 3,000 psi was required to obtain a mean pore size in the edge seals about one-fourth the mean pore size in the central portion of the substrate. The high edge seal compaction pressure resulted in excessive seal expansion during carbonization of the molded article. One aspect of the process of the present invention is that, as the bulk density of the starting material approaches the desired formed part density, the compressive loads required to form the part are reduced. By appropriate selection of the bulk density of the fibers used in the edge seal material, it has been possible to form dense edge seals with compacting pressures as low as 50 psi. A benefit of these lower forming pressure is minimization or even elimination of dimensional changes during carbonization, as well as the ability to use smaller, less expensive compaction apparatus.

Commonly owned U.S. patent application Ser. No. 306,835 entitled "Ribbed Electrode Substrates" by Richard D. Breault and Glen J. Goller and filed on the same date herewith describes electrode substrates with improved properties and characteristics and which may be fabricated by the process of the present invention.

The foregoing and other objects, features and advantages of the present invention will become more apparent in the light of the following detailed description of the preferred embodiments thereof as shown in the accompanying drawing.

BRIEF DESCRIPTION OF THE DRAWINGS

FIG. 6 is an enlarged cross-sectional view, taken along the line 6—6 of FIG. 7, showing the flexible mold in greater detail.

FIG. 7 is an enlarged perspective view showing the material feeders of the system of FIG. 5 in greater detail.

FIG. 8 is a graph showing the relationship between mean pore size of a graphitized carbon fiber/resin article and the density of that article.

FIG. 9 is an enlarged cross-sectional view of a portion of the substrate of FIG. 2.

BEST MODE FOR CARRYING OUT THE INVENTION

To practice the present invention is is important to understand the nature of the relationship between the processing parameters, the bulk density of the carbon fibers used in the fiber/resin mixture from which the article is to be made, and the density of the formed article. In the case of the present invention the article forming material or mixture is a homogeneous blend of dry, carbonizable resin powder and carbon fibers. The resin may be of the thermoplastic type, but is preferably a thermoset resin. The processing steps to which the material will be subjected comprise a heating and compacting step, preferably, but not necessarily, including carbonization of the resin. More specifically, the material is heated to above the melting point of the resin and compacted from its known original volume to a known new volume (or to a known new thickness if only the thickness changes during compaction). Compacting a known amount of bulk material to a known volume is the same as compacting at a known pressure, since there is a one-to-one correspondence between compacted volume and the pressure required to achieve that volume. The temperature and compaction pressure are maintained until sufficient bonding (or curing, if the resin is a thermoset) of the fibers occurs such that when the compacting pressure is removed the article retains its compacted volume or thickness.

To determine the relationships referred to above for the purpose of ultimately fabricating fuel cell electrode substrates, a series of trials was conducted by fabricating 5 in. by 5 in. flat plates from 30 gram samples of a variety of resin/carbon fiber blends incorporating carbon fibers having different initial bulk densities. All fibers had the same average diameter. The different fiber bulk densities were obtained by using different average carbon fiber lengths. Each blend, however, had the same ratio of 30 weight percent resin to 70 weight percent carbon fiber. For these trials the resin was a thermosetting resin having a melting point of about 150° F. The tests involved uniformly distributing each 30 gram sample mixture within a 5 in. by 5 in. mold and compacting the mixture by applying a known pressure for 3.0 minutes using a flat plate die while maintaining the mixture at a temperature of 300° F. during that time. Three (3) minutes was determined to be sufficiently long to result in sufficient curing of the resin such that when the pressure was removed the part retained its compacted thickness.

Figure 1:
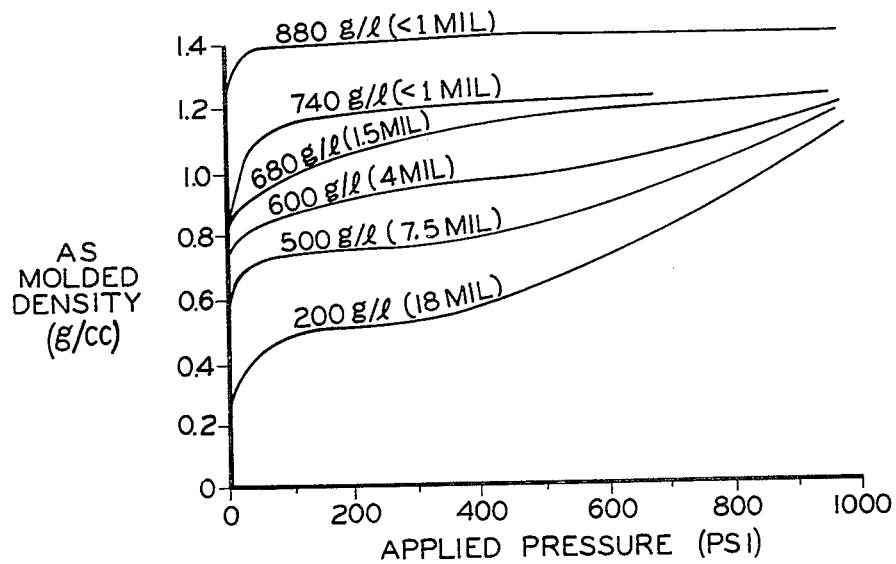
FIG. 1 is a graph showing the relationship of compaction pressure to the density of molded articles made from carbon fiber/resin mixtures of varying fiber bulk density.

Results of the tests are displayed on the graph of FIG. 1. The as-molded density of the sample is read off the vertical axis, and the applied compaction pressure is read off the horizontal axis. Each individual curve on the graph represents mixtures incorporating carbon fibers of the indicated bulk density in terms of grams/liter. The average carbon fiber length used in these mixtures is in parenthesis. Note that for fiber bulk densities of both 740 gm/l and 880 gm/l the average carbon fiber length is stated as less than 1.0 mil. Although the average carbon fiber lengths of these two samples were not characterized sufficiently to distinguish them quatitatively, mixtures with a fiber bulk density of 880 gm/l did, of course, have an average carbon fiber length less than mixtures incorporating fibers having a bulk density of 740 gm/l. The carbon fibers having a bulk density of 880 gm/l are very close to being particulate and probably have an average length to diameter ratio of between 1.0 and 2.0.

Several interesting observations can be made from analyzing the curves of FIG. 1. Perhaps of greatest significance is the observation that if a constant pressure is used to mold a number of flat parts of the same weight, and each fiber/resin charge has a different fiber bulk density, then each of the formed parts will have a different as-molded density. The molded density of each part will be directly proportional to the fiber bulk density of its charge.

The bulk density versus molded density relationship will, of course, depend upon the physical characteristics of the carbon fibers and resin used, and their ratio in the mixture. This relationship can readily be determined for any system using a series of tests similar to those just described. For mixtures having the same ratio of starting materials (i.e., resin to fiber) there is also a simple one-to-one inverse relationship between molded density and porosity. If the mixtures also have the same average carbon fiber diameter, the as-molded parts will have densities and mean pore sizes dependent only upon the average carbon fiber length for a fixed molding pressure.

FIG. 8 is a graph showing the relationship between the density and mean pore size of a graphitized plate with a range of densities between 0.38 g/cc and 0.68 g/cc. The plates were made in the same manner as the plates used to generate the data of FIG. 1. The plates were made from mixtures comprising 30 weight percent resin and 70 weight percent carbon fibers (fiber bulk density: 500 gm/l; average fiber length: 7.5 mils) by a method similar to the method for making the plates used in the tests described with respect to FIG. 1. To generate the curve of FIG. 8 compacting pressures were varied to obtain the different densities. Curves may also be generated showing the relationship between the bulk density of fibers and mean pore size of the finished article for fixed compacting pressure on a known initial volume of molding mixture. To avoid complexity in characterizing a family of materials (i.e., molding mixtures), it is preferred to vary fiber bulk density by changing only the average fiber length, although a family of curves could probably also be generated based on fiber length to diameter ratio without the constraint of constant fiber diameter. A very adequate variety of density, porosity and mean pore size characteristics for the fabrication of ribbed fuel cell electrode substrates has been attained without resorting to varying the fiber diameter.

From the foregoing it is clear that fiber length selection (i.e., fiber bulk density selection) can be used to obtain a preferred combination of density, porosity and mean pore size in the as-molded part. Carbonization, if desired, can then be accomplished by heating to a sufficiently high temperature, and may even include graphitization. Carbonization, with or without graphitization, results in predictable resin weight loss (based on the carbon yield of the resin) and predictable part dimensional changes (i.e., expansion or shrinkage). If a part is to be carbonized these known changes are taken into account in selecting the bulk density of fibers used in the starting material so as to yield a carbonized part with the requisite characteristics.

In the fabrication of a part having areas with different porosities and mean pores sizes, if one breaks down the part into sections and treats the sections as if they were parts within a part, it becomes apparent that the mean pore size and porosity in each section can be regulated by adjusting the average carbon fiber length in the blends used to form each section. For example, an improved ribbed substrate with wet seals may be molded by a process analogous to the process used to develop the graph of FIG. 1 by using very short fibers or possibly even graphite powder (length to diameter ratio of 1.0) in the wet or edge seal section of the mold, longer fibers (greater length to diameter ratio) in the rib portion, and longest fibers (greatest length to diameter ratio) in the web portion which interconnects the ribs. The molded substrate will have dense, but porous, small pore edge seals, more porous larger pore ribs, and even more porous and larger pore webs. Compare this to the prior art, as represented by aforementioned U.S. Pat. No. 4,165,349, wherein molding a ribbed substrate using identical material throughout the mold yielded ribs which were significantly more porous than the webs as a result of pressure differentials arising from the mold pattern itself. With the present invention, by taking into account the differences in regional pressures within the mold when selecting fiber length for the different sections of the mold, the web pore size can be controlled independently of the rib pore size.

It is also clearly observable from the data of FIG. 1 that there are very significant compression advantages to using shorter fibers in areas where higher density is required, such as in the wet seal portions of the substrate. For example, referring to FIG. 1, the pressure required to compact a 500 gm/l fiber bulk density mixture to a density of 1.1 gm/cc is 875 psi, compared to a mere 45 psi for the 740 gm/l fiber bulk density mixture. Thus, the compressive load required for the short fiber blend is nearly 20 times less than the required load for the longer fiber blend, thereby significantly reducing the size of the equipment required for compaction. Furthermore, higher compressive loads increase residual stresses within the molded part. Some of this stress is released during heat treatment in the form of dimensional changes which may be difficult if not impossible to tolerate. With this invention, ribbed substrates with wet seals can now be molded without subjecting any portion of the molding compounds to pressures exceeding 200 psi.

If the molded article needs to be heat treated, consideration must be given to the shrinkage or other dimensional changes which occur as a result of converting the resin to carbon. Substrates for fuel cells must be heat treated to carbonize virtually all the resin in order to obtain certain required electrical, chemical and thermal properties, as is well known in the art. The extent of shrinkage is proportional to the weight percent resin in the molding mixture and is highly predictable. Adjacent areas made with different amounts of resin will shrink to different extents. To minimize mechanical strains induced by this shrinkage, which can result in cracking or delamination, it is preferred to use substantially the same weight percent resin throughouth the substrate. The extent to which differences may be acceptable will depend upon the configuration of the substrate and the heat treatment used.

Figure 2:
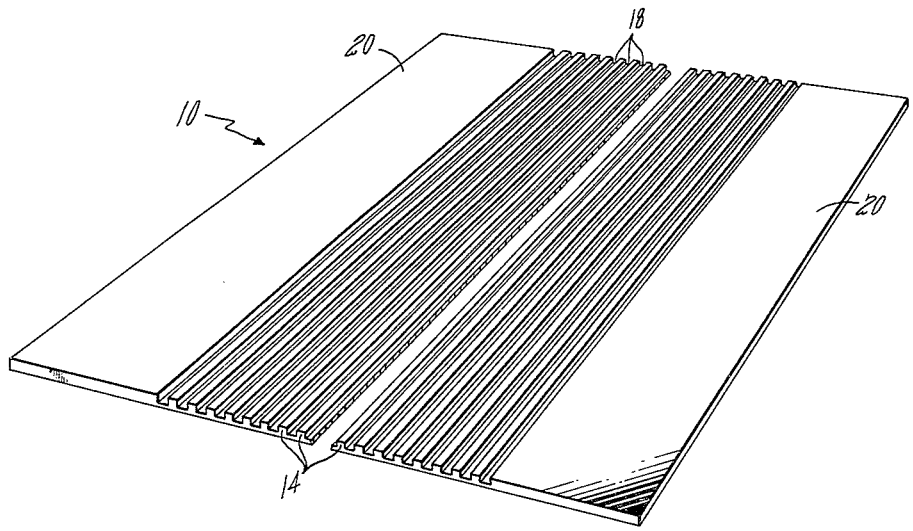
FIG. 2 is a perspective view of a ribbed electrode substrate which may be fabricated by the process of the present invention.

Ribbed electrode substrates with edge seals may be made according to the present invention in a conventional Carver press using a steel die having the negative or mirror image of the part to be formed. A perspective view of such a ribbed substrate is shown in FIG. 2. An enlarged cross section perpendicular to the direction of the ribs is shown in FIG. 9. The substrate 10 essentially comprises a flat sheet 12 having spaced apart parallel ribs 14 extending outwardly from one surface 16 thereof forming channels 18 across the substrate. The portions of the sheet 12 between the ribs 14 and forming the bottoms of the channels 18 are herein referred to as unsupported webs 22. The portions of the sheet 12 under the ribs 14 are hereinafter referred to as supported webs 24. The substrate 10 also includes edge seals 20 parallel to the ribs 14 and integral with the webs. Assume the substrate has an unsupported web width w of 0.065 inch, a web or sheet thickness t of 0.025 inch, a rib and supported web width s of 0.055 inch and a rib height h of 0.038 inch. The total thickness of each substrate is thus 0.063 inch, which is the sum of the rib height and the web thickness. The edge seals are 1.0 inch wide and have a thickness e of 0.063 inch.

To fabricate this substrate, web, rib, and seal molding compounds are prepared, all comprising 30%, by weight, of Reichhold Varcum ® phenolic resin (grade 24-655) and 70%, by weight, pitch based carbon fibers (nominal solid density of 2.0 gm/cc) with a nominal diameter of about 10 microns. The fibers are chopped into three different batches each having a different average fiber length using a Wiley mill or equivalent. The batch for the web molding compound (i.e., the sheet 12) has an average fiber length of 7.5 mils and a bulk density of 500 g/l; the batch for the rib 14 molding compound has an average fiber length of 4.0 mils and a fiber bulk density of 600 g/l; and the batch for the edge seal 20 molding compound has an average fiber length of less than 1.0 mil and a bulk density of 880 g/l. Note that these bulk density values correspond to curves appearing in FIG. 1. They dry phenolic resin powder is mixed with each of these batches of carbon fibers in a blender for 3–5 minutes.

Figure 3:
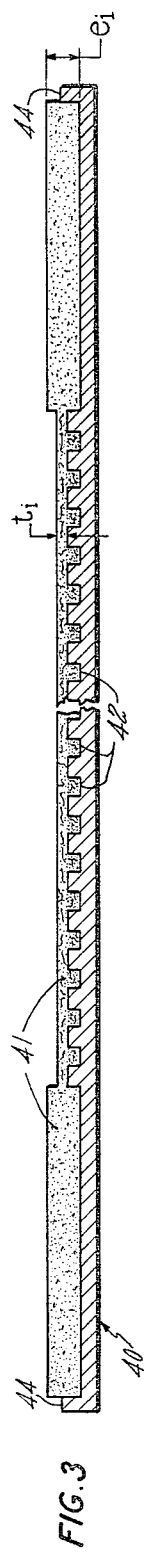
FIG. 3 is an illustrative cross-sectional view of a portion of a mold die filled with molding compounds in accordance with the process of the present invention.

The compounds are then deposited into the appropriate area of a room temperature mold having a inverse image of the part to be formed. Such a mold 40 is shown in cross section in FIG. 3 filled with the molding materials 41 prior to the step of heating and compacting. In this example the rib forming portion or grooves 42 of the mold 40 would be filled first by sifting the rib molding compound into the grooves 42. A slight excess of material is preferably deposited and lightly compacted into the grooves using, for example a doctor blade, to assure there are no voids within the grooves. The light compacting increases the initial bulk density of the rib forming compound from about 600 g/l (note: the mixture bulk density is approximately the same as the fiber bulk density) to about 700 g/l. The seal molding compound and web molding compound are then sifted into the mold. The seal compound is deposited to a thickness or height $e_i$ of 0.15 inch; and the web compound is deposited to a thickness $t_i$ of 0.035 inch.

The filled die is then placed between platens heated to 300° F., and the molding material is compacted between them. The top surface 44 of the mold 40 acts as a shim such that the material is compacted to the desired overall substrate thickness of 0.063 inch. Within a few seconds the temperature of the molding compounds increases to approximately the same temperature as the press platens. The molding pressure and temperature are held for 3.0 minutes and then released. The molding compounds retain their compacted thickness.

Figure 4:
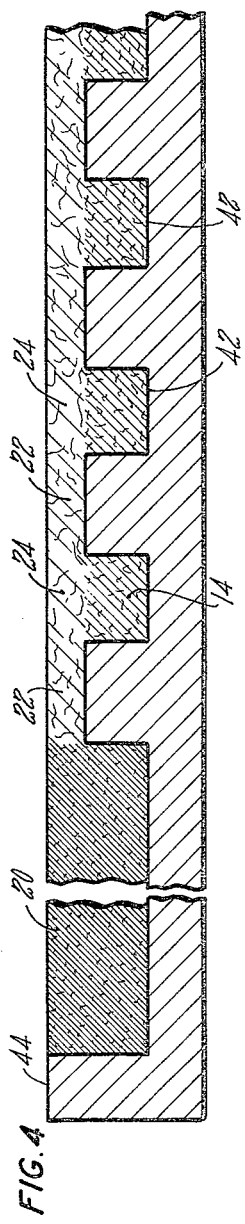
FIG. 4 is a cross-sectional view of the mold of FIG. 3 after heating and compacting the molding material in accordance with the teachings of the present invention.

FIG. 4 shows the molding compounds in the mold 40 after the pressure has been removed. The different cross hatchings represent areas of different molded densities. The as-molded densities of these areas is as follows: edge seals 20, 1.4 gm/cm$^3$; unsupported webs 22, 0.66 gm/cm$^3$; supported webs 24, 0.60 gm/cm$^3$; and ribs 14, 0.80 gm/cm$^3$. For this example it is estimated that during compaction the rib and supported web material will receive a pressure of less than 10 psi; and the unsupported web material and edge seal material a pressure of about 50 psi.

After compaction the part is removed from the mold. The as-molded part is then carbonized in an inert atmosphere by increasing the temperature at an approximate rate of 40° C. per hour to 950° C. It is held at 950° C. for about 1.0 hour. At this point essentially all the resin had been converted to carbon. The part is then further heated to 2800° C. to convert the carbon to graphite-like material. In this finished part the unsupported webs will have a density of 0.57 gm/cm$^3$, porosity of 74%, and mean pore size of 29.4$\mu$; the supported webs will have a density of 0.52 gm/cm$^3$, porosity of 77%, and mean pore size of 34.0$\mu$; the ribs will have a density of 0.69 gm/cm$^3$, porosity of 69%, and a mean pore size of 20$\mu$; and the edge seals will have a density of 1.2 gm/cm$^3$ and mean pore size of 8$\mu$.

As described in commonly owned U.S. patent application Ser. No. 306,835 filed on even date herewith, it is preferred that the rib mean pore size in 60 to 75% of the web mean pore size although rib mean pore size 50 to 100% of the web mean pore size may be satisfactory for some applications. Also, rib porosity is preferably somewhat less than the web porosity (e.g., 70% porosity compared to 80%) porosity; however, porosity differences are not as critical to performance as pore size difference. As further described in the companion application, the web mean pore size is preferably 25–45 microns and the edge seal mean pore size is preferably no more than 10 microns, most preferably no more than 7.5 microns. Most preferably the web mean pore size is 25–35 microns and the rib mean pore size is 15 to 27 microns. The process of the present invention as set forth above can readily provide all these difficult to achieve differences in mean pore sizes and porosities.

Figure 5:
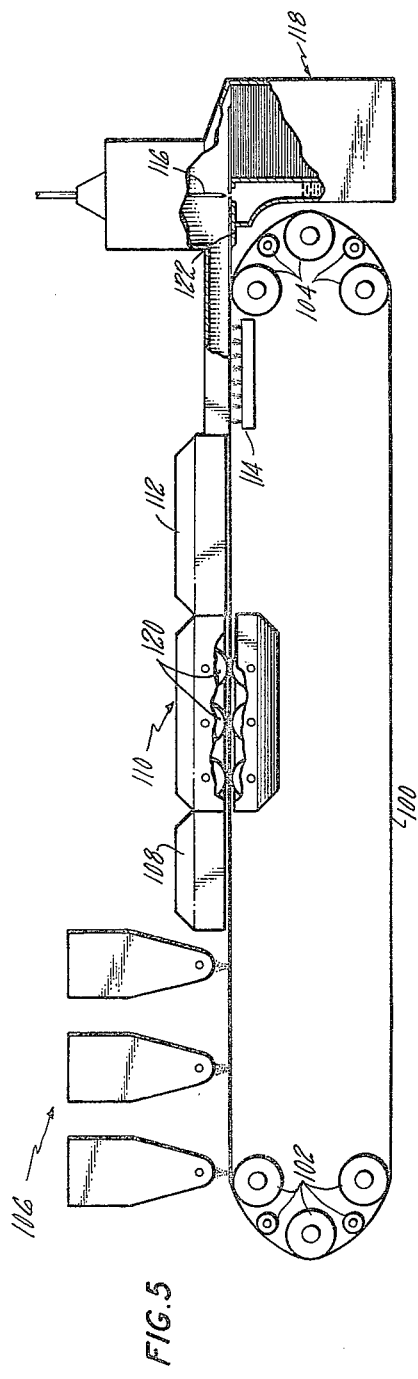
FIG. 5 is a schematic representation of a continuous belt molding system which may be used to practice the process of the present invention.

An alternate and preferred method for fabricating substrates in accordance with the present invention is best described with reference to FIG. 5, which is a schematic representation of apparatus which is herein referred to as a continuous belt molder. In this embodiment of the present invention the molding die is in the form of a continuous flexible belt 100, shown in cross section in FIG. 6. Like the more conventional die of the foregoing example, the belt cross section is essentially the inverse image of the part to be formed, which in this instance is a ribbed substrate like that shown in FIGS. 2 and 9. The belt 100 passes around and is stretched tightly between sets of rollers 102, 104. The belt molding apparatus also includes material feeders 106, preheat or melt oven 108, compaction apparatus 110, cure oven 112, quench apparatus 114, a trimming device 116, and stacking apparatus 118.

In operation, drive means, not shown, drives the rollers 102, 104 to continuously move the belt at a constant, known speed. The material feed apparatus 106 drops the molding materials onto the correct area of the mold 100 at a controlled rate. The belt with the deposited molding materials passes through the over 108 which preheats the material to above the melt point of the resin. The mold with the preheated material then passes through the compaction apparatus 110, which in this instance comprises a series of heated rolls 120. The rolls 120 compact the material to the desired thickness. The speed of the belt mold 100 is set to assure that the compaction pressure has been maintained sufficiently long such that when the compacted material exits from between the last pair of rollers, the carbon fibers have been bonded together by the resin and the part retains its compacted thickness.

Assuming the use of a thermoset resin, the compacted material within the belt mold 100 then passes through the oven 112 to completely cure the molding compounds. The cured material is then cooled by quenching apparatus 114, which in this case is a device which applies jets of water to the underside of the belt mold 100.

Finally, as the belt mold 100 begins to move downwardly around the rollers 104, the cured molding material, which is rigid, continues to move in a horizontal plane onto a table top 122 whereupon it is automatically cut into pieces of appropriate length by the automatic trimming device 116. The cut parts are automatically stacked by the apparatus 118. The stacked parts are removed at intervals and carbonized in an oven remote from the continuous belt molding apparatus.

FIG. 7 shows the material feeders 106 in somewhat more detail. Since, in this particular example, as with the previous example, it is desired to form a substrate having the smallest mean pore size in the edge seals, larger pores in the ribs, and largest pores in the webs, the feeding apparatus 106 comprises three separate feeders 124, 126, and 128 for feeding rib material, seal material, and web material, respectively. Each of the feeders includes a hopper 130, 132, 134, at the bottom of which are rotating brushes 136, 138, 140, respectively. Disposed under each brush 136, 138, 140 is a foraminous plate or sieve 142, 144, 146, respectively. The rotating brushes contact the sieves. The size of the holes in the respective sieves and the rate of rotation of the brushes control the rate at which the molding compounds drop from the feeders onto the moving belt mold 100. The speed of the belt mold controls the amount of material deposited per square inch of projected belt surface. The width of the sieves 142, 144, 146 and their position above the belt mold 100 is determined by where on the belt mold it is desired to deposit the various molding compounds. The rib material feeder 124 drops material between the edge seal forming grooves 147 (FIG. 6) of the die. A reciprocating doctoring plate 148 fills and lightly compacts the material into the rib forming grooves 150 of the mold. The seal material feeder 126 deposits its mixture into the edge seal forming grooves 147. The web forming feeder 128 thereafter deposits a layer of web material between the already deposited edge seal material; this web material will ultimately define the flat sheet portion or webs of the substrate.

Although in this embodiment a doctor blade is used only with the rib material, doctoring means such as a blade or roller may be associated with any of the feeders to either level off and/or lightly compact the deposited material. Careful design of the sieves and their associated brushes, and careful control of brush rotational speeds and other possible variables makes it possible to deposit material from the feeders in such precise amounts and in such precise locations that doctoring is unnecessary for the seal and web materials.

Turning, now, to the other steps in the continuous belt mold substrate forming operation hereinabove described, it should be noted that it may be possible to eliminate the preheating apparatus 108 by incorporating additional heating means in the vicinity of and in conjunction with the compaction apparatus 110. Along these same lines, the curing oven 112 might also be eliminated if the belt speed and temperatures within the compaction zone are selected such that the compacted material leaves the compaction zone completely cured. It will also be apparent that the curing oven 112 could be followed by a carbonization furnace. Quenching may or may not thereafter be required depending upon how soon the parts are to be handled.

Regarding the compaction apparatus 110, although three sets of rollers 120 are shown in the drawing, a single set with larger rolls might be used, the number of rollers not being critical to the process. It might even be possible to eliminate the rollers and to compress the molding mixtures between flat plates; however, with a continuously moving belt mold 100, this would require that the plates move in the direction of and at the same speed as the belt mold. Upon release of pressure, some mechanism would be required to return the plates upstream to compress the next following section of material within the belt mold.

The flexible belt must be made from a material sufficiently hard or must in some way be designed to avoid significant deflection when subjected to compaction pressures. One possible material is a castable RTV silicone rubber known as Eccosil ® 4954 sold by Emerson and Cumings of Canton, Mass. Subscale belt mold samples have been cast from a steel, ribbed die constructed to look like a small scale finished substrate. The cured rubber mold had excellent definition down to the smallest detail. These belt mold samples were used in tests designed to simulate the continuous belt mold process hereinabove described. Subscale ribbed substrates were made in these tests. All portions of these substrates were satisfactory in terms of porosity and mean pore size; however, due to deflection of the silicone rubber belt mold in the area of the edge seals during the compaction step it was not possible to control the seal dimensions to our required specifications. Evidently, the compaction pressures seen by the edge seals resulted in compression of the rubber belt in that area. There were no problems, however, in the web and rib areas. These tests were conducted using an edge seal molding compound having carbon fibers with a bulk density of 740 gm/l. This resulted in estimated pressures of 75–125 psi in the seal zone. Use of fibers in the seal area with a bulk density of 880 gm/l would result in lower seal compaction pressures and less mold deformation. It is estimated that no significant mold deformation will occur if compaction pressures are less than about 50 psi.

Although the examples used herein are directed to fabricating ribbed substrates for fuel cell electrodes, it will be appreciated that the process is useful for fabricating other types of articles made from carbon fiber/resin mixtures and which require different mean pore sizes, porosities and/or densities in different areas thereof.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A process for forming porous, resin bonded carbon fiber articles, said articles having predefined areas with different preselected mean pore sizes, comprising the steps of:
   selecting different dry mixtures of carbon fibers and thermosetting resin corresponding to each of said preselected mean pore sizes, each different mixture having substantially the same ratio of carbon to resin and a different carbon fiber average length to diameter ratio, the carbon fiber length to diameter ratio of each mixture being chosen to provide its respective mixture with carbon fibers having a preselected fiber bulk density;
   depositing known quantities of each of the said different mixtures onto an article forming surface in a location corresponding to that predefined area of the article to which said mixture corresponds; and
   heating and compacting the deposited material, comprising heating to a first temperature sufficient to melt the resin and compacting the deposited material to a preselected volume by pressing first surface means against said deposited material and maintaining the compacting pressure and the temperature of the material for a first length of time sufficient to effect bonding of the carbon fibers such that said preselected volume is retained after said pressure is removed;
   wherein the preselected bulk densities of the carbon fibers in said mixtures are chosen such that, after said mixtures are subject to said step of heating and compacting, the resulting article will have the said preselected mean pore sizes in the predefined areas to which said mixtures correspond.

2. The process according to claim 1 wherein the resin is a thermosetting resin and said temperature and compacting pressure is maintained until the resin is substantially cured.

3. The process according to claim 2 wherein the step of heating and compacting includes increasing the temperature beyond said first temperature after the compacting pressure has been removed to heat treat the compacted product.

4. The process according to claims 2 or 3 wherein the average carbon fiber diameter in each of the said mixtures is essentially the same and the differences in bulk density of the fibers used in said mixtures are due solely to differences in the average length of the fibers used in each mixture.

5. The process according to claims 2 or 3 wherein the step of depositing said different mixtures onto an article forming surface comprises depositing said mixtures within a mold.

6. The process according to claim 1 wherein said first surface means is the surface of a flat plate.

7. The process according to claim 1 wherein said first surface means includes the surface of a roller, and said step of pressing includes passing said deposited material between rollers.

8. The process according to claim 1 wherein said article forming surface is a continuous belt.

9. The process according to claim 5 wherein said mold is a continuous belt mold.

10. The process according to claim 1 wherein said deposited material is preheated to a temperature sufficient to melt the resin prior to compacting.

11. The process according to claim 9 wherein said belt mold moves continuously.

12. The process according to claim 9 wherein said belt mold is made from a silicone rubber and the compacting pressure is less than about 50 psi.

13. The process according to claim 3 wherein said resin is a carbonizable resin, and said step of heat treating includes carbonizing said resin.

14. The process according to claim 3 wherein each of said different mixtures has substantially the same ratio of carbon fibers to resin.

15. A process for molding a porous, resin bonded, carbon fiber electrode substrate comprising a flat sheet with a plurality of parallel ribs extending outwardly from and integral with one side thereof, the flat sheet defining webs interconnecting said ribs, said ribs and webs defining parallel channels extending across said substrate, wherein the ribs have a required mean pore size less than the required mean pore size of said webs, said process utilizing a mold having grooves therein which correspond to the ribs to be molded and having a volume corresponding to said flat sheet, comprising the steps of:
depositing a plurality of dry molding mixtures in known quantities within said mold, including depositing within the mold grooves a first molding mixture of carbon fibers and carbonizable resin and depositing a second molding mixture over said first mixture to fill the volume of said mold corresponding to said flat sheet, said first mixture having an average carbon fiber length to diameter ratio less than that of said second mixture and a corresponding fiber bulk density greater than that of said second mixture; and
heating and compacting the deposited mixtures to a desired thickness, comprising heating to a temperature sufficient to melt the resin and maintaining the compacting pressure and the temperature of the molding mixtures for a length of time sufficient to effect bonding of the carbon fibers such that when the pressure is removed said desired thickness is retained, including increasing said temperature after the compacting pressure has been removed to carbonize the compacted material;
wherein the said average carbon fiber length to diameter ratios and corresponding bulk densities of the fibers used in said molding mixtures are chosen to result in said required mean pore sizes and porosities in said areas of said substrate where said mixtures are utilized after said step of carbonizing.

16. The process according to claim 15 wherein the mold is a continuous belt mold.

17. The process according to claims 15 or 16 wherein the resin is a thermosetting resin and the step of heating and compacting comprises maintaining said temperature and compacting pressure until said resin is cured.

18. The process according to claim 17 wherein said first and second molding mixtures are dry mixtures of 50-80%, by weight, carbon fibers and 20-50%, by weight, carbonizable resin having a carbon yield of at least 40%.

19. The process according to claim 17 wherein said required mean pore size of said ribs is 60-75% of the required mean pore size of said webs.

20. The process according to claim 16 wherein the average carbon fiber diameter in each of the said mixtures is essentially the same, each of the different mixtures has substantially the same ratio of carbon fibers to resin, and the differences in the bulk densities of the carbon fibers used in each mixture are due solely to differences in the average length of the fibers.

21. The process according to claim 20 wherein the average carbon fiber diameter is about 10 microns.

22. The process according to claim 15 wherein the compacting pressure is applied by a flat plate.

23. The process according to claim 20 wherein the compacting pressure is applied by roller means.

24. The process according to claim 23 wherein the compacting pressure is applied by passing the belt mold between at least one pair or rollers.

25. The process according to claim 20 wherein said substrate has a pair of edges parallel to said ribs, said edges having a required mean pore size less than said ribs, said process including the additional step of depositing a third molding mixture within said mold to fill an area of said mold corresponding to said edges of said substrate, said third mixture being a dry mixture of carbon fibers and carbonizable resin, the fibers having an average length to diameter ratio less than the length to diameter ratio of the fibers in said first mixture and a corresponding bulk density greater than the bulk density of the fibers in said first mixture.

26. A process for molding a carbon fiber, thermosetting resin bonded fuel cell electrode substrate comprising a plurality of parallel ribs interconnected by a web portion, wherein the ribs have a required mean pore size and porosity and said web portion has a required mean pore size and porosity which is greater than the mean pore size an porosity of said ribs, comprising the steps of:
filling a rib defining portion of a mold with a known amount of a first carbon fiber and resin mixture;
filling a web defining portion of the mold with a known amount of a second carbon fiber and resin mixture having essentially the same ratio of carbon fibers to resin as the first mixture and an average carbon fiber length to diameter ratio greater than that of said first mixture; and heating and compacting the material to a predetermined thickness in said mold, comprising heating to a temperature sufficient to melt the resin, maintaining said temperature and the compacting pressure until sufficient curing of the resin occurs such that the compacted material retains its said predetermined compacted thickness after removing said pressure, and removing said compacting pressure and thereafter heating to a greater temperature to carbonize the resin, wherein the length to diameter ratios of said fibers in said first and second mixtures are selected to yield the required mean pore sizes and porosities in said ribs and webs of said substrate after said step of carbonizing.

27. The process according to claim 26 wherein said substrate includes a seal portion along each edge thereof parallel to said ribs, each seal portion being integral with said web portion and having a required mean pore size less than the mean pore size of said ribs, including, prior to said step of heating and compacting, the additional step of filling a seal defining portion of the mold with a third carbon fiber and resin mixture having essentially the same ratio of carbon fibers to resin as the first and second mixtures and an average carbon fiber length to diameter ratio less than that of said first mixture and selected to yield the required mean pore size of said seal portion after the step of carbonizing.

28. The process according to claims 2 or 27 wherein the average diameter of the fibers in each of the different mixtures of fiber and resin is the same.

29. The process according to claim 28 wherein the required mean pore size of the web portion is 25–35 microns, and the required mean pore size of the ribs is 60–75% of the mean pore size of the web portion, and the required mean pore size of the seal portion is no more than about 10 microns.

* * * * *

UNITED STATES PATENT AND TRADEMARK OFFICE
CERTIFICATE OF CORRECTION

PATENT NO. : 4,426,340
DATED : January 17, 1984
INVENTOR(S) : Glen J. Goller, Richard D. Breault, J. Harold Smith It is certified that error appears in the above-identified patent and that said Letters Patent is hereby corrected as shown below:

Column 9, line 20 "0.15" should be --0.105--

Column 9, line 60 "in" should be --is--

Column 10, line 30 "over" should be --oven--

Column 14, line 59 "an" should be --and--

Signed and Sealed this

Twenty-fourth Day of July 1984

[SEAL]

Attest:

GERALD J. MOSSINGHOFF

Attesting Officer

Commissioner of Patents and Trademarks